United States Patent
Franke et al.

(10) Patent No.: US 8,319,465 B2
(45) Date of Patent: Nov. 27, 2012

(54) METHOD FOR THE AUTOMATIC ADJUSTMENT OF A PROTECTIVE DEVICE HAVING AN EXCESS-CURRENT RELEASE, PARTICULARLY A LOW-VOLTAGE CIRCUIT BREAKER

(75) Inventors: Henry Franke, Berlin (DE); Bernd Schwinn, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 568 days.

(21) Appl. No.: 12/450,280

(22) PCT Filed: Mar. 11, 2008

(86) PCT No.: PCT/EP2008/052843
§ 371 (c)(1),
(2), (4) Date: Oct. 2, 2009

(87) PCT Pub. No.: WO2008/113710
PCT Pub. Date: Sep. 25, 2008

(65) Prior Publication Data
US 2010/0097731 A1   Apr. 22, 2010

(30) Foreign Application Priority Data
Mar. 19, 2007  (DE) .......................... 10 2007 013 551

(51) Int. Cl.
*H02P 7/00*  (2006.01)
(52) U.S. Cl. ........ 318/434; 318/453; 318/727; 318/729; 318/782
(58) Field of Classification Search ................. 318/434, 318/453, 475, 471, 473, 479, 727, 729, 778, 318/782, 783, 812; 361/20, 23, 24, 28, 29, 361/30, 87, 89, 94, 115
See application file for complete search history.

(56) References Cited

U.S. PATENT DOCUMENTS

| 4,413,325 | A  |   | 11/1983 | Elfner et al. |
|-----------|----|---|---------|---------------|
| 4,670,812 | A  | * | 6/1987  | Doerfler et al. ................ 361/83 |
| 5,637,975 | A  | * | 6/1997  | Pummer et al. ............... 318/729 |
| 5,925,995 | A  |   | 7/1999  | Yoshida et al. |
| 6,252,365 | B1 |   | 6/2001  | Morris et al. |
| 7,019,480 | B2 | * | 3/2006  | Suzuki et al. ............ 318/400.08 |

(Continued)

FOREIGN PATENT DOCUMENTS

DE        24 31 540 A1    1/1976

(Continued)

OTHER PUBLICATIONS

ISR.

(Continued)

*Primary Examiner* — Bentsu Ro
*Assistant Examiner* — Thai Dinh
(74) *Attorney, Agent, or Firm* — Harness, Dickey & Pierce, P.L.C.

(57) ABSTRACT

The method for the automatic adjustment of a protective device includes determining an integral of the square of a motor current over time on the basis of a time motor current profile of an asynchronous motor on a load, after switching on and reversing and deriving a tripping time of the overcurrent release on the basis of the determined integral, the integral, which corresponds to a heating of the asynchronous motor, being related to a multiple of the square of the rated current, and the motor current profile including at least the starting current, the transient and the selected motor rated current.

16 Claims, 2 Drawing Sheets

U.S. PATENT DOCUMENTS 7,336,048 B2 *   2/2008   Lohr ............................ 318/434
7,369,389 B2 *   5/2008   Vicente et al. ................. 361/115

FOREIGN PATENT DOCUMENTS

| | | |
|---|---|---|
| DE | 31 11 818 A1 | 4/1982 |
| DE | 31 21 779 A1 | 12/1982 |
| DE | 698 14 775 T2 | 3/2004 |
| DE | 20 2004 015 511 | 11/2005 |
| DE | 20 2004 015 511 U1 | 12/2005 |
| GB | 1 508 505 A | 4/1978 |
| GB | 2 101 430 B | 1/1983 |
| JP | 06-086449 | 3/1994 |
| JP | 6086449 A | 3/1994 |

OTHER PUBLICATIONS

German Search Report.
International Search Report.

* cited by examiner $$T_P = (\int_0^{t_A} I^2 dt) / (7{,}2 * I_R)^2 = INT / (7{,}2 * I_R)^2$$

METHOD FOR THE AUTOMATIC ADJUSTMENT OF A PROTECTIVE DEVICE HAVING AN EXCESS-CURRENT RELEASE, PARTICULARLY A LOW-VOLTAGE CIRCUIT BREAKER

PRIORITY STATEMENT

This application is the national phase under 35 U.S.C. §371 of PCT International Application No. PCT/EP2008/052843 which has an International filing date of Mar. 11, 2008, which designated the United States of America, and which claims priority on German patent application number DE 10 2007 013 551.5 filed Mar. 19, 2007, the entire contents of each of which are hereby incorporated herein by reference.

FIELD

At least one embodiment of the invention generally relates to a method for automatic setting of a protective device which has an overcurrent release, in particular of a low-voltage circuit breaker with an overcurrent release.

BACKGROUND

Low-voltage circuit breakers are known as protective devices and are also used for protection of asynchronous motors as specific loads. They are used to protect the asynchronous motors against overloading and to protect the power distribution installation against short-circuiting. Particularly in the event of overloading, the asynchronous motors may be thermally overloaded. In order to prevent this, a tripping time at a reference current is set, inter alia, as a parameter on the overcurrent release of the circuit breaker, from which tripping time the delay before tripping of the low-voltage circuit breaker is obtained, depending on the overcurrent that is flowing.

In accordance with the appropriate standard, the tripping time can be selected from a time band. In addition to the tripping time, the parameters for the overload current and for the short-circuit current can also be set. In the case of asynchronous motors, their specific characteristics must be taken into account, and in practice this is done by way of the abovementioned setting parameters.

Although the motor manufacturers specify the technical data for the asynchronous motors (rating, starting current in comparison to the rated current, etc.) these do not, however, allow optimum setting of the overcurrent release, and therefore of the low-voltage circuit breaker. The setting of the overcurrent release is made even more difficult because of the fact that the setting parameters of the protective device depend on the load. Different characteristics for the individual asynchronous motors also make the setting process more difficult. In general, the parameters are therefore set by trial and error, that is to say the parameters are increased until the protective device no longer trips prematurely.

SUMMARY

At least one embodiment of the invention specifies a method which allows automatic setting of the overcurrent release of a protective device which has an asynchronous motor as a load.

At least one embodiment of the invention provides that the integral of the square of the motor current over time t is determined on a predetermined load, in particular on the rated load, after switching on and reversing, and the tripping time Tp of the overcurrent release is derived on the basis of this integral, in that this integral, which corresponds to the heating of the asynchronous motor, is related to a predetermined multiple of the square of the rated current, with the motor current profile comprising at least the starting current and the transient of the selected motor rated current. The parameters for the overcurrent release are therefore determined on the basis of the time motor current profile, with the special features of this profile being determined automatically (using a "teach-in" method). The determined integral in this case corresponds essentially to the heating of the asynchronous motor.

The accuracy of the determination of the tripping time can be increased if the motor current profile comprises the switching peak after switching on and reversing.

In order to determine the upper time limit of the integral in a simple manner, it is proposed that a second time is determined after switching on and reversing and after passing through the switching peak, the starting current and the transient area in the region of the selected motor rated current, at which second time the rate of change of the motor current is less than a predetermined value, and that the integral of the square of the motor current is determined between the switching-on time and the second time.

According to the Standard, 7.2 times the square of the rated current may expediently be chosen for the predetermined multiple.

The parameter for the overload current can be set easily by setting this on the basis of the current at the second time, that is to say in particular to be 1.03 times this current.

The parameter for the short-circuit current can be determined automatically when a first time is determined on the basis of the time motor current profile when the asynchronous motor is loaded with its rated load in the region of the starting current, that is to say after the occurrence of the switching peak and before passing through the transient, at which time the magnitude of the rate of change of the motor current undershoots a predetermined value, and in that the parameter of the short-circuit current is determined on the basis of the current at this first time, with the parameter for the short-circuit current in particular being chosen to be 1.25 times this current.

Blocking protection should expediently be provided for asynchronous motors, which switches off the asynchronous motor if the stalling torque is undershot.

BRIEF DESCRIPTION OF THE DRAWINGS

The invention will be described in more detail in the following text with reference to one example embodiment. In the figures.

DETAILED DESCRIPTION OF THE EXAMPLE EMBODIMENTS

Figure 1:
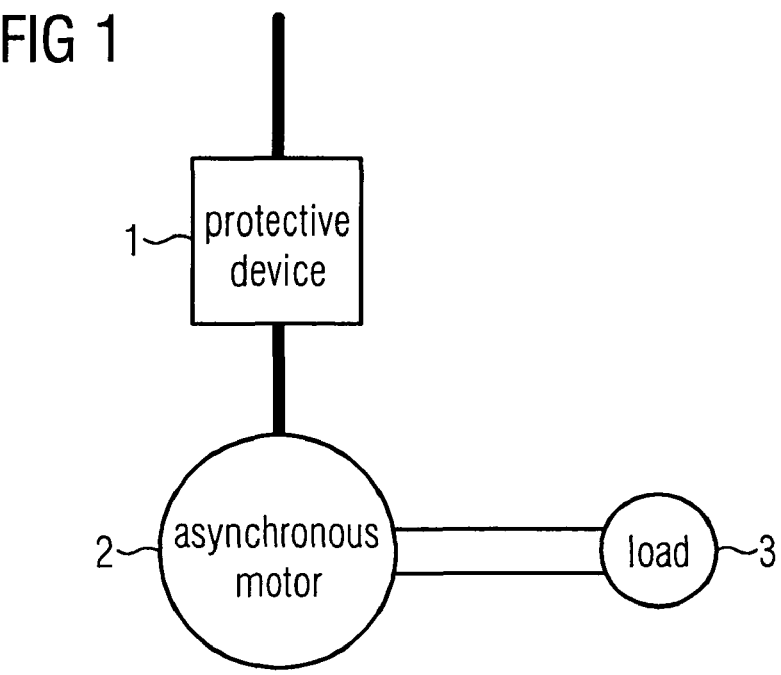
FIG. 1 shows a protective device with an asynchronous motor to be protected and with a load.

FIG. 1 shows a highly schematic illustration of a protective device 1 in the form of a low-voltage circuit breaker for a power distribution installation, which is followed as the load to be protected by an asynchronous motor 2 with a load 3, with the load 3 in the example embodiment here being equal to the rated load. The protective device 1 must be protected against overcurrent and protects the power distribution installation against short-circuiting. It has an overload release on which a plurality of parameters can be set, in particular for matching to the asynchronous motor 2. The parameters are determined automatically on the basis of the time profile of the motor current and the square of the motor current I of the asynchronous motor 2.

Figure 2:
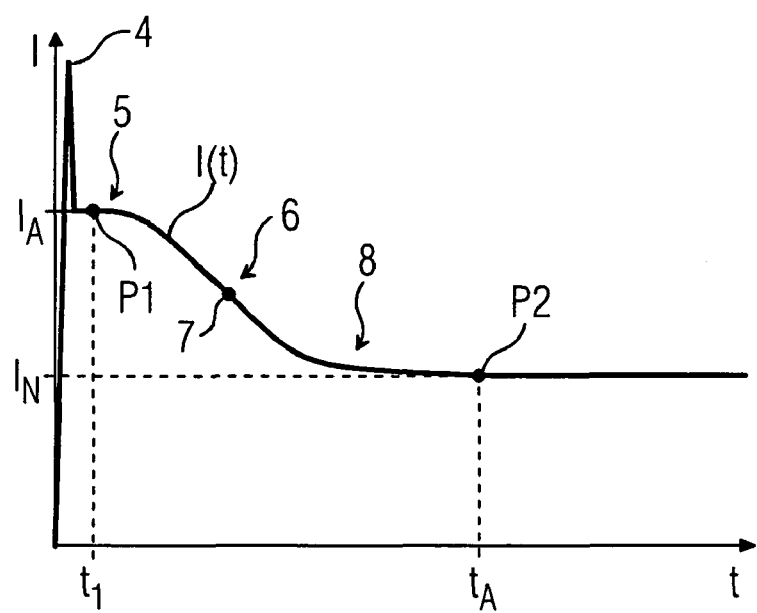
FIG. 2 shows the current/time characteristic of the asynchronous motor after switching on, FIG. 3 shows the square of the motor current plotted against time after switching on as shown in FIG. 2.

FIG. 2 shows the motor current I of the asynchronous motor 2 as a function of time t. As a result of the required magnetization immediately after switching on the asynchronous motor 2, the time motor current profile I (t) in FIG. 2 has a switching peak 4 which then merges into the starting current IA in the starting current region 5. The starting current region 5 is followed by a transient region 6 with a point of inflection 7, whose end area 8 merges into the region of the motor rated current 9. The motor current profile I(t) in FIG. 2 is assumed here for the rated load (as a predetermined load). It has two significant points P1, P2 at the times t1 and tA, at which the rate of change of the motor current I is in each case less than a predetermined value, for example in this case less than 5 A/s.

The current I at the time t! (the point P1) is defined as the starting current IA, and the current at the time tA (point P2) is defined as the rated current IN, since this is virtually the same as the rated current of the asynchronous motor 2 at the time tA.

The determination of the setting parameters for a protective device 1 and an asynchronous motor 2 with a rating of 110 kW will be described in the following text.

Rated current of the low-voltage circuit breaker: 250 A
Setting range of the overcurrent release used:
  overload: IR=100 A-250 A (0.4-1.0×In)
  short circuit: Ii=312 A-2750 A (1.25-11×In)
Values taken from the assumed current/time characteristic of the asynchronous motor 2:
  maximum starting current IA (at the point P1): 1320 A
  current draw after start-up (at the point P2): 196 A
  starting time: 8s The setting parameter for the short-circuit current Ii is derived from the maximum starting current 1320 A. In order to prevent inadvertent tripping of the protective device 1 during starting, the setting parameter for the short-circuit current is set to 125% of the maximum starting current IA at the point P1, that is to say in this case to 1650 A. As a constraint, it is assumed that the low-voltage circuit breaker has so-called rush-in suppression.

The setting parameter for the overload current IR is set to 103% of the current of 196 A which flows after start-up, that is to say to 202 A.

Figures 3, 4:
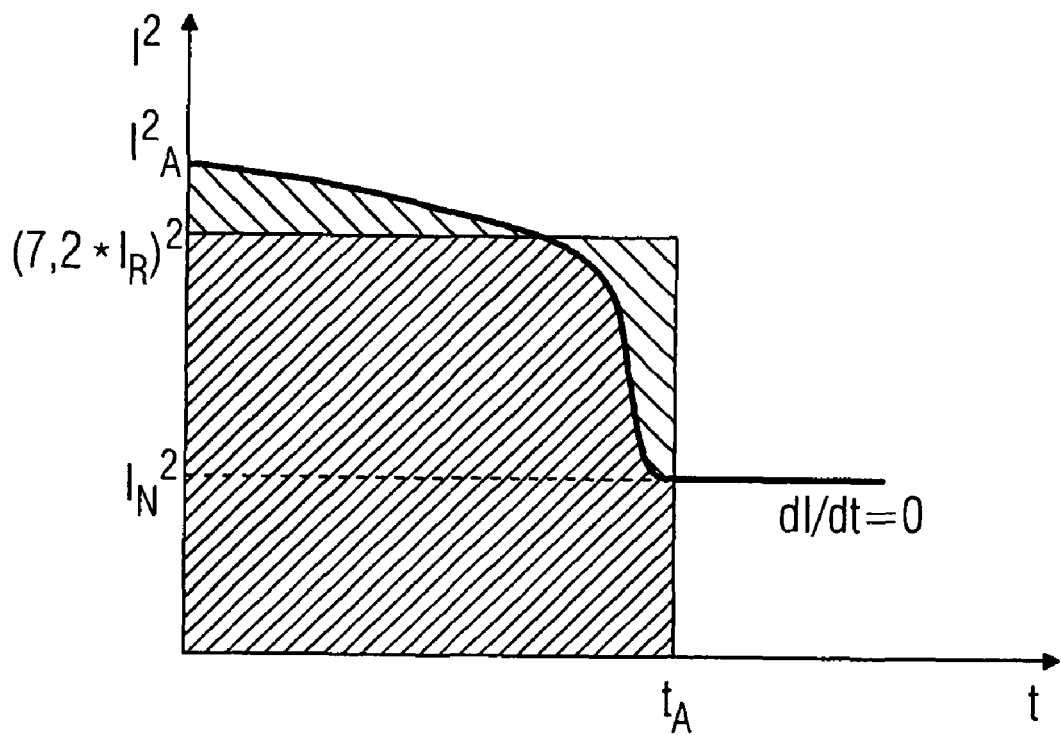
FIG. 4 shows a formula with an integral for calculation of the tripping time on the basis of the measured starting time tA.

The square of the motor current I is plotted against time t in FIG. 3, with the illustration likewise showing the time tA and the currents $(IN)^2$ and $(IA)^2$. The area under the curve in FIG. 3 corresponds to the heating of the asynchronous motor 2 up to the time tA, from which a tripping time Tp is obtained as a third setting parameter for the asynchronous motor 2 by division by 7.2 times (as a predetermined multiple) of the square of the measured rated current IN (in accordance with the IEC Standard).

The setting parameter for the tripping time TP is calculated on the basis of the measured starting time tA of 8 s, using the integral INT on the basis of the formula in FIG. 4.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for automatic setting of a protective device including an overcurrent release, the protective device having an asynchronous motor as a load to be protected against overloading, the protective device protecting the power distribution installation against short-circuiting, wherein at least one tripping time has to be set as a parameter on the overcurrent release, to ensure that no thermal overloading of the asynchronous motor occurs, the method comprising:
  determining the integral of the square of the motor current over time on the basis of the time motor current profile of the asynchronous motor on a load, after switching on and reversing; and
  deriving the tripping time of the overcurrent release on the basis of the determined integral, the integral, which corresponds to the heating of the asynchronous motor, being related to a multiple of the square of the rated current, and the motor current profile including at least the starting current, the transient and the selected motor rated current.

2. The method as claimed in claim 1, wherein the motor current profile comprises the switching peak after switching on and reversing.

3. The method as claimed in claim 2, wherein a second time is determined after switching on and reversing and after passing through the switching peak, the starting current and the transient area in the region of the selected motor rated current, at which second time the rate of change of the motor current is less than a predetermined value, and wherein the integral of the square of the motor current is determined between the switching-on time and the second time.

4. The method as claimed in claim 2, wherein at least the parameters for the overload current, for the tripping time and for the short-circuit current is set on the overcurrent release, and wherein a first time is determined on the basis of the time motor current profile when the asynchronous motor is loaded with its rated load in the region of the starting current, at which time the magnitude of the rate of change of the motor current undershoots a predetermined value, and wherein the parameter for the short-circuit current is determined on the basis of the current at the first time.

5. The method as claimed in claim 2, wherein blocking protection is provided for the asynchronous motor and switches off the asynchronous motor if the stalling torque is undershot.

6. The method as claimed in claim 1, wherein a second time is determined after switching on and reversing and after passing through the switching peak, the starting current and the transient area in the region of the selected motor rated current, at which second time the rate of change of the motor current is less than a predetermined value, and wherein the integral of the square of the motor current is determined between the switching-on time and the second time.

7. The method as claimed in claim 1, wherein the multiple is 7.2 times the square of the rated current.

8. The method as claimed in claim 1, wherein at least the parameters for the overload current, for the tripping time and for the short-circuit current are set on the overcurrent release, and wherein the parameter for the overload current is set on the basis of the current at the second time.

9. The method as claimed in claim 8, wherein the parameter for the overload current is 1.03 times the current.

10. The method as claimed in claim 1, wherein at least the parameters for the overload current, for the tripping time and for the short-circuit current is set on the overcurrent release, and wherein a first time is determined on the basis of the time motor current profile when the asynchronous motor is loaded with its rated load in the region of the starting current, at which time the magnitude of the rate of change of the motor current undershoots a predetermined value, and wherein the parameter for the short-circuit current is determined on the basis of the current at the first time.

11. The method as claimed in claim 10, wherein the parameter for the short-circuit current is 1.25 times the current.

12. The method as claimed in claim 1, wherein blocking protection is provided for the asynchronous motor and switches off the asynchronous motor if the stalling torque is undershot.

13. The method as claimed in claim 1, wherein the load is a rated load.

14. The method as claimed in claim 1, wherein at least the parameters for the overload current, for the tripping time and for the short-circuit current is set on the overcurrent release, and wherein a first time is determined on the basis of the time motor current profile, after the occurrence of the switching peak, and before passing through the transient, at which time the magnitude of the rate of change of the motor current undershoots a predetermined value, and wherein the parameter for the short-circuit current is determined on the basis of the current at the first time.

15. The method as claimed in claim 14, wherein the parameter for the short-circuit current is 1.25 times the current.

16. The method as claimed in claim 1, wherein blocking protection is provided for the asynchronous motor and trips the protective device if the stalling torque is undershot.

* * * * *